United States Patent [19]
Revelli, Jr.

[11] Patent Number: 5,276,745
[45] Date of Patent: Jan. 4, 1994

[54] INTEGRATED OPTIC READ/WRITE HEAD FOR OPTICAL DATA STORAGE INCORPORATING SECOND HARMONIC GENERATOR, ELECTRO-OPTIC TRACKING ERROR ACTUATOR, AND ELECTRO-OPTIC MODULATOR

[75] Inventor: Joseph F. Revelli, Jr., Rochester, N.Y.

[73] Assignee: Eastman Kodak Company, Rochester, N.Y.

[21] Appl. No.: 961,576

[22] Filed: Oct. 15, 1992

[51] Int. Cl.[5] .............................................. G02B 6/12
[52] U.S. Cl. ........................................ 385/14; 385/8; 385/12; 385/10; 359/152; 369/44.12
[58] Field of Search ............... 369/44.12, 44.23, 44.13; 385/14, 8, 31, 40, 12, 10, 33, 132; 359/152, 154, 157, 298

[56] References Cited

U.S. PATENT DOCUMENTS

| | | | |
|---|---|---|---|
| 4,801,184 | 1/1989 | Revelli | 385/8 |
| 4,802,153 | 1/1989 | Kataoka et al. | 369/45 |
| 4,948,225 | 8/1990 | Rider et al. | 350/96.34 |
| 4,955,977 | 9/1990 | Dao et al. | 350/96.34 |
| 4,991,919 | 2/1991 | Nishiwaki et al. | 350/96.19 |
| 5,058,970 | 10/1991 | Schildkraut et al. | 359/328 |
| 5,070,488 | 12/1991 | Fukushima et al. | 385/14 |
| 5,131,068 | 7/1992 | Kanarian et al. | 385/14 |
| 5,179,615 | 1/1993 | Tanaka et al. | 385/132 X |

OTHER PUBLICATIONS

Arimoto et al. Waveguide Optical Deflector for an Optical Disk Tracking Actuator Using a Surface Acoustic Wave Device, Applied Optics, Jan. 10, 1990, pp. 247–250.

L. Buydens, et al. GaAs/AlGaAs Multiple-Quantum-well Vertical Optical Modulators on Glass Using the Epitaxial Lift-Off Technique, Optics Letters, vol. 16, No. 12, Jun. 15, 1991, pp. 916–918.

L. Li, et al. Variable-Groove-Depth Grating Couplers, OSA Annual Technical Digest, 1991 (Optical Society of America, 1991) vol. 17, p. 26.

D. Marcuse, Directional Couplers Made of Nonidentical Asymmetric Slabs, Part II, Journal of Lightwave Technology, vol. LT-5, No. 2, pp. 268–273 (1987).

M. Matsumoto in Analysis of the Blazing Effect on Second Order Gratings, Tech. Dig., vol. 5, Integrated Photonics Research Con., Paper WC-2, pp. 130–131 (1990).

K. Meehan et al., Disorder of an Al Ga As–GaAs Super Lattice by Donor Diffusion, Apl. Phys. Lett., vol. 45, pp 549–551, (1984).

(List continued on next page.)

Primary Examiner—John D. Lee
Assistant Examiner—Phan T. Heartney
Attorney, Agent, or Firm—Raymond L. Owens

[57] ABSTRACT

An integrated electro-optic waveguide device has a substrate, an optically transparent lower buffer layer positioned atop the substrate, an optically transparent nonlinear optic (NLO) organic poled polymer waveguide positioned atop the lower buffer layer, and a GaAs laser diode optically coupled to the waveguide. The NLO material has a higher refractive index than the buffer layer. A ridge waveguide section forms an extended resonator cavity for the laser diode and combines a modulation function and an in-cavity quasi-phase matched second harmonic generation function. A grating coupled ridge-to-planar waveguide section combines a beam expansion function, a TE-TM conversion function, and a beam turning function. A planar surface prism electrode section provides electro-optic waveguide beam deflection. A dual linear grating coupler section performs the output/input coupling. Beam turning is accomplished by a planar waveguide mirror section. An electro-optic ridge waveguide Mach-Zehnder interferometer wavefront sensor section generates TES and FES signals.

5 Claims, 8 Drawing Sheets

OTHER PUBLICATIONS

R. L. Thornton et al., Monolithic Waveguide Coupled Cavity Lasers and Modulators Fabricated by Impurity Induced Disordering, J. Lightwave Technology, vol. 6, No. 6, pp. 786-792, (1988).

R. L. Thornton et al., Optoelectronic Device Structures Fabricated by Impurity Induced Disordering, J. Crystal Growth, vol. 77, pp. 621-628, (1986).

L. A. Weller-Brophy and D. G. Hall, Local Normal Mode Analysis of Guided Mode Interactions with Waveguide Gratings, Journal of Lightwave Technology, vol. 6, No. 6, pp. 1069-1082, Jun. 1988.

D. J. Williams Organic Polymeric and Non-Polymeric Materials with Large Optical Nonlinearities, Agnew. Chem. Int. Ed. Engl., vol. 23, pp. 690-703, (1984).

J. Zyss Nonlinear Organic Materials for Integrated Optics: A Review, Journal of Molecular Electronics, vol. 1, pp. 25-45, (1985).

INTEGRATED OPTIC READ/WRITE HEAD FOR OPTICAL DATA STORAGE INCORPORATING SECOND HARMONIC GENERATOR, ELECTRO-OPTIC TRACKING ERROR ACTUATOR, AND ELECTRO-OPTIC MODULATOR

CROSS-REFERENCE TO RELATED APPLICATIONS

This application is related to co-pending applications Ser. No. 864,268, filed Apr. 6, 1992 by Alan C. G. Nutt, for Laser Processing and Device Evaluation of Organic Optical Materials; Ser. No. 913,579, filed Jul. 15, 1992 by Joseph F. Revelli for Waveguide Optical Pick-up Head Mach-Zehnder Interferometer Wavefront Sensor Apparatus and Method; and Ser. No. 916,422, filed Jul. 21, 1992 by Joseph F. Revelli et al. for Electro-optic Waveguide Deflector Using a Nonlinear Organic Optic Film or Liquid-Crystal Overlay Cell for Use in an Optical Pick-up Head.

This application is related to co-filed, application Ser. No. 953,925, filed Sep. 29, 1992, by Jose Mir for Waveguide Nonlinear Optical frequency Converter With Integral Modulation and Optimization Means.

TECHNICAL FIELD OF THE INVENTION

This invention relates to an integrated electro-optic waveguide read/write optical head.

BACKGROUND OF THE INVENTION

Bulk optic pick-up heads which are used to retrieve information stored on optical disks are well known. The principles of operation of such devices are briefly as follows. Polarized light from a laser diode is collimated and sent through a polarization beam splitter (PBS) and a quarterwave plate. Circularly polarized light is focused onto the information bearing surface of the optical disk by an objective lens. Information is encoded in the form of pits and land areas which are located along tracks. As the disk spins, the intensity of the reflected light is modulated by reflection off of these pits and land areas. This modulation is ultimately sensed and used to generate the data signal. Furthermore, the distribution of the reflected light is modified by motion of the data tracks due to disk runout and is ultimately used to generate the tracking error signal (TES). The reflected light is then re-collimated by the objective lens. Because the degree of recollimation is directly related to the displacement of the reflecting surface of the optical disk from nominal focus as the disk rotates, measurement of this collimation is used to generate the focus error signal (FES). The sense of circular polarization is reversed upon reflection off of the optical disk so the encoded light becomes linearly polarized in a direction perpendicular to the initial polarization state upon passage through the quarterwave plate a second time. The state of polarization of this light is such that it is reflected by the PBS to a detector section which retrieves TES, FES, and the data signal. TES and FES are amplified and are used to drive electro-mechanical tracking and focus actuators, respectively, which are attached to the objective lens. These closed-loop servo systems maintain both tracking and focus as the disk spins.

Both partial, as well as, fully integrated optic heads have been recently proposed. In these devices, the conventional optical and electromechanical elements of bulk optical heads are replaced at least in part by planar waveguide optical and electro-optical elements, respectively. These integrated optic devices are intrinsically lower in mass and smaller in volume and form-factor than are the bulk optic counterparts and can be mass produced using IC-type processing techniques. Hence, they offer the possibly of improved performance and lower manufacturing costs compared to conventional pick-up heads. On the other hand, integrated optic heads must provide one or more of the key components which define an optical pick-up head; namely, a) a source of coherent light radiation which is focused into a diffraction-limited spot on the information-bearing surface of the optical disk, b) a means of retrieval of the modulated light returning from the disk, c) isolation of the modulated light returning from the optical disk from the source, d) means of sensing the TES, FES, and data signal, e) actuator means for correcting focus and tracking errors due to disk motion, and in the case of a read/write head f) a means of modulating the source intensity during the write operation.

Partially integrated optic heads incorporating acousto-optic light deflection as a tracking actuator means are revealed in U.S. Pat. No. 4,802,153 and by Arimoto et al. *Waveguide Optical Deflector for an Optical Disk Tracking Actuator Using a Surface Acoustic Wave Device,* Applied Optics, Jan. 10, 1990, pp. 247–250. Unfortunately, these devices both require relatively high power rf generators to drive surface acoustic wave (SAW) transducers. Additional disadvantages of these devices include relatively slow response times for the SAW deflection and rf noise generation. These devices are partially integrated in that they do not incorporate means for detection of TES, FES, data signal, or tracking and focus actuation. Consequently, they require additional bulk optical and mechanical elements to form a complete optical pick-up head.

Fully or near-fully integrated pick-up heads have been disclosed in Japanese Patent Laid-open No. 263350 (Dec. 26, 1985) and in U.S. Pat. No. 4,991,919. These devices are both characterized by two separated curved and blazed gratings. One grating couples the light out of the planar waveguide and focuses it onto the optical disk without the need of an external bulk objective lens. The light is reflected off of the disk at an angle such that when it returns to the planar waveguide, it is incident on the second grating which couples it into the waveguide. The blazing eliminates the possibility of light being coupled into waveguide substrate modes. The device disclosed in the former patent has the disadvantage that the spot quality produced by the focus grating output coupler is extremely sensitive to laser diode wavelength shift due to the dispersive nature of the focus grating coupler. The device described in the latter patent has the disadvantage that it does not provide for source isolation. The latter device also is complicated by the requirement for a unique polarizer which is capable of converting linear polarization to concentrically circular polarization. Neither device allows for electro-optic deflection or modulation.

European Patent Publication No. 0,174,008 discloses a fully integrated optical head based on an electro-optic waveguide such as single crystal $LiNbO_3$. Electro-optic focus and tracking actuator functions are provided by shaped surface electrode structures. This device suffers the disadvantage that the surface electrode structures are necessarily far apart. Given the magnitude of the electro-optic coefficient of materials such as $LiNbO_3$, this implies that unrealistically large voltages are required to obtain fringing fields in the electro-optic waveguide region between these surface electrodes large enough to cause appreciable deflection. This device concept also suffers the same difficulties mentioned above in that the focused spot quality on the optical disk is extremely sensitive to laser diode wavelength drift and the dispersive nature of the focus grating coupler.

The use of nonlinear optical materials in laser cavities to achieve conversion of stimulated radiation at the fundamental wavelength to radiation at the second harmonic wavelength is well known. The nonlinear optic (NLO) materials usually used in such applications are inorganic single crystals such as potassium dihydrogen phosphate (KDP), potassium titanyl phosphate (KTP), ammonium dihydrogen phosphate (ADP), lithium niobate ($LiNbO_3$) or lithium tantalate ($LiTaO_3$). Such devices are usually bulky and expensive to fabricate. Accordingly, it will be appreciated that it would be highly desirable to have a compact optical read/write device with a laser diode structure that incorporates NLO material and generates visible radiation by second harmonic generation (SHG) of the fundamental wavelength.

SUMMARY OF THE INVENTION

The present invention overcomes the difficulties outlined above by using a novel integrated optic head which incorporates NLO organic poled polymer thin films or any thin film nonlinear optic medium. For example, Langmuir-Blodgett organic thin films, or thin films of inorganic materials such as KDP, KTP, ADP, $LiNbO_3$, $LiTaO_3$, or the like could be used to replace the NLO organic poled polymer. The full potential of NLO organic materials is realized when the material shaping allows for waveguided propagation. Advantage is taken of the nonlinear optical properties of NLO organic films to obtain both second harmonic generation and the linear electro-optic effect. Thin films of these materials offer design flexibility which enable integration of a variety of devices on the same substrate. Such films can be deposited on substrates such as silicon or GaAs, and can be fashioned into planar or channel waveguides thus permitting integration of nonlinear optic (i.e., second harmonic generation, electro-optic tracking, and electro-optic modulation), and opto-electronic (i.e., lasing and light detection) functions. NLO organic materials can have electro-optic coefficients which equal or exceed those of the best inorganic electro-optic materials. Placing planar electrodes on either side of these thin nonlinear optic films, together with the relatively large electro-optic coefficients of NLO materials, permit the design of uniform-field electro-optic waveguide devices such as deflectors, phase-shifters, mode converters, and modulators which operate at relatively low drive voltages.

Nonlinear optical functions, such as second harmonic generation, and the linear electro-optic effect become more efficient the higher the power density. Waveguided structures present the possibility of maintaining, over a theoretically infinite path, in the case of a lossless medium, optical power transversely confined over dimensions on the order of the wavelength. Another advantage of waveguided configurations is that for a given fundamental wavelength, it is possible to actually insure phase matching of the fundamental and the second harmonic guided modes either by the use of periodically poled quasi-phase matching gratings or by tailoring the waveguide characteristic features, such as thickness, indexes of layer and/or substrate, jointly or independently, to control the effective indexes of the fundamental and second harmonic guided modes.

Inclusion of a built-in SHG function in an integrated optic pick-up head offers a significant advantage over prior art devices because information packing density on the optical disk increases as the inverse square of the wavelength of the radiation used to write the information. The integration of SHG offers the additional advantage that conversion occurs only at the fundamental wavelength for which the phase matching condition is satisfied which means that the wavelength of the SHG light is insensitive to laser diode drift. This wavelength stability along with the use of a linear grating coupler instead of a curved focus grating coupler eliminates drift and deterioration of the focused spot at the disk surface.

It is desirable to have a compact laser diode structure that incorporates NLO material and generates visible radiation by second harmonic generation of the fundamental wavelength. The inclusion of the SHG function in the extended cavity of the laser serves to improve SHG conversion efficiency because it permits multiple passes of the fundamental radiation in the nonlinear channel waveguide. Also, the integrated electro-optic modulator function enables writing on the optical disk without the need for direct modulation of the laser drive current and the associated instabilities.

Other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

The integrated electro-optic waveguide device of the present invention is characterized by multiple optical and electronic elements formed monolithically on a common substrate. The substrate can be GaAs, silicon, glass, or any of a number of insulating materials. In the case of semiconducting substrates such as silicon or GaAs, electronic components can be integrated directly in substrates. In the case of GaAs, the laser diode can be integrated into the substrate as well. Furthermore, the semiconducting substrates can be locally heavily doped to provide lower electrodes for the electro-optic components. On the other hand, these semiconducting substrates must be coated with low index of refraction transparent buffer layers to prevent excess propagation loss in the light guided in the waveguide layers. These buffer layers are typically 2 to 10 $\mu$m thick and can be made of thermally grown $SiO_2$ (in the case of silicon substrates), rf sputtered $SiO_2$, or a low index of refraction organic polymer. No buffer layer is required for low index glass substrates except in those areas where the lower metal electrodes for the electro-optic devices are deposited.

A nonlinear optic (NLO) organic polymer is spin-coated on the first buffer layer. Suitable electro-optic polymers are those which exhibit a high second order polarization susceptibility and are transparent to both the fundamental and second harmonic wavelengths of the laser diode. Such polymers are disclosed in the commonly assigned U.S. Pat. Nos. 4,792,208, 4,948,225, and 4,955,977. The thickness of the NLO layer should be such that a single mode propagates at the second harmonic wavelength (i.e., 0.2 to 2 $\mu$m). The various channel, ridge and planar waveguide sections of the NLO film can be defined photolithographically and formed by reactive ion etching (RIE) processing. Alternatively, direct laser ablation techniques, such as taught by Nutt in application Ser. No. 864,268, the disclosure of which is incorporated herein by reference, using shadow masks and excimer lasers can be used for this purpose.

Figure 1:
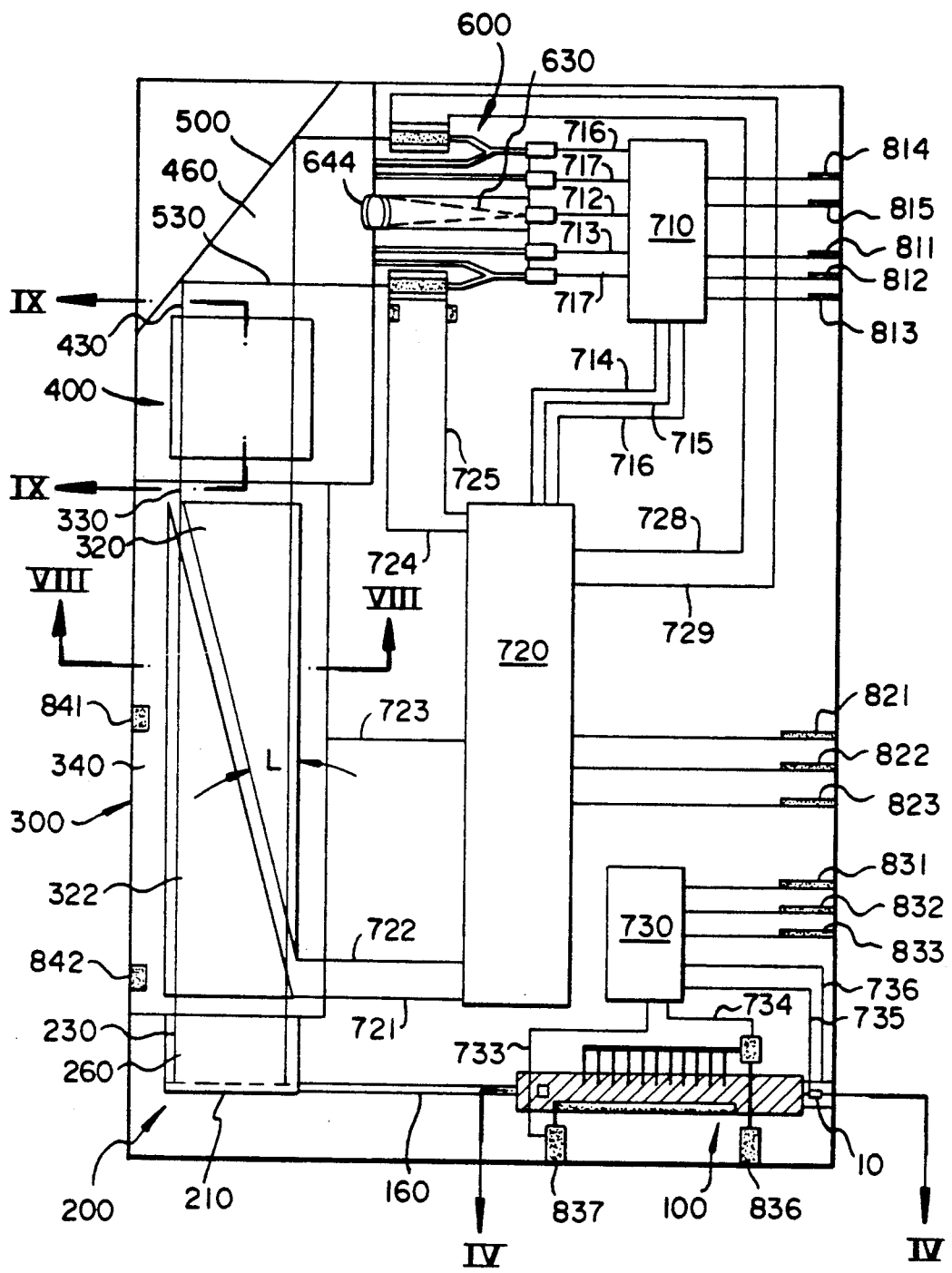
FIG. 1 is a schematic plan view of a preferred embodiment of an integrated electro-optic waveguide optical data storage read/write device according to the invention.

Referring to FIG. 1, infrared light of wavelength $\lambda_R$ from laser diode 10 is coupled into the TE mode of a ridge waveguide which is part of section 100 of the integrated electro-optic waveguide device. In section 100 advantage is taken of the nonlinear optical properties of the material which is used to form ridge waveguide 60 to provide the combined functions of electro-optic modulation and second harmonic generation. Integrated circuit 730 provides the driving signals for modulation through data, clock signal, and power supply connections are made to integrated circuit 730 through connectors 831, 832, and 833, respectively. Second harmonic light of wavelength $\lambda_B = \lambda_R/2$ propagates through ridge waveguide 160 to the ridge-to-planar waveguide section 200. In this section, the light is coupled from ridge waveguide 160 to planar waveguide 260, reflected by 90 degrees, converted from TE polarization to TM polarization, and expanded to beam 230.

Expanded guided beam 230 propagates into beam deflector section 300. In this section, buffer layer 340 is formed on top of electro-optic planar waveguide layer 260 so that layer 260 is sandwiched between buffer layers 340 and 40. Electric fields perpendicular to the plane of film 260 are generated in electro-optic planar waveguide 260 by means of voltages applied between spaced prism-shaped electrodes 320, 322 which are positioned on top of buffer layer 340 and a ground plane electrode 321 (see FIG. 8) which is formed on substrate 32 beneath buffer layer 40 and directly below the prism-shaped electrodes 320, 322.

As disclosed in co-pending application Ser. No. 916,422, the disclosure of which is incorporated herein by reference, TM-polarized guided beam 230 is deflected by an index of refraction change in the spaced prism-shaped regions defined by surface electrodes 320, 322. This change in index is induced by interaction of the TM polarized light and the applied electric fields in electro-optic waveguide 260. Beam 230 is deflected by beam deflector 300 in response to tracking error signals fed back from wavefront sensor 600 through integrated circuit 720. Lines 721 and 722 provide the interconnection between integrated circuit 720 and the spaced prism-shaped surface electrodes of electro-optic beam deflector 300 while line 723 provides electrical connection to the ground plane electrode 321 of the deflector. TES servo signals are monitored externally through pad 821 and power and clock signal are fed to chip 720 through pads 822 and 823.

Still referring to FIG. 1, the guided beam 430 continues to propagate from beam deflector 300 to dual grating coupler 400. Dual grating coupler 400 is comprised of two planar waveguides 260 and 460 which are one atop the other and separated by buffer layer 340. Beam 330 is coupled out of the lower waveguide 260 by a blazed output grating coupler which is formed on top of waveguide film 260. After reflection off of the optical disk surface, light is coupled into guided beam 430 in upper waveguide 460 by a blazed input grating formed on upper waveguide 460. Guided beam 430 is reflected at waveguide reflector 500 into guided beam 530. This beam is incident on Mach-Zehnder interferometer wavefront sensor pickup section 600 the construction and operation of which are disclosed in co-pending application Ser. No. 913,579, the disclosure of which is incorporated herein by reference.

Waveguide condenser lens 644 captures a portion of incident beam 530 and focuses it into beam 630. The rf signal is retrieved by an integrated photodetector located at the focus of beam 630. The output of this photodetector is electrically connected to integrated circuit 710 by means of interconnect 712. As disclosed in application Ser. No. 913,579, the Mach-Zehnder interferometer wavefront sensor pickup section 600 also provides signals which can be converted to FES and TES. These signals are electrically connected to integrated circuit 710 by means of interconnects 711, 713, 716 and, 717.

Integrated circuit 710 provides signal amplification and conditioning functions to generate TES and FES signals. RF output, TES, and FES are monitored externally by means of interconnect pads 811, 812, and 813, respectively. Interconnect pads 814 and 815 supply power and clock signals to integrated circuit 710. Interconnects 714, 715, and 716 provide the reference, TES, and FES signals, respectively, to integrated circuit 720 which in turn provides drive voltages to electro-optic deflector section 300 to compensate for the tracking error and thus complete the servo loop.

Mach-Zehnder interferometer bias offset adjustment signals are also provided by integrated circuit 720 via interconnects 724, 725, 728, and 729 in response to the TES, FES and reference signals provided by integrated circuit 710. These bias offset signals are used to adjust the electro-optically induced phase shift in one arm of each of the Mach-Zehnder interferometers in wavefront sensor pickup section 600. The phase shift adjustments are necessary to insure that the interferometers operate in a linear region.

Figure 2:
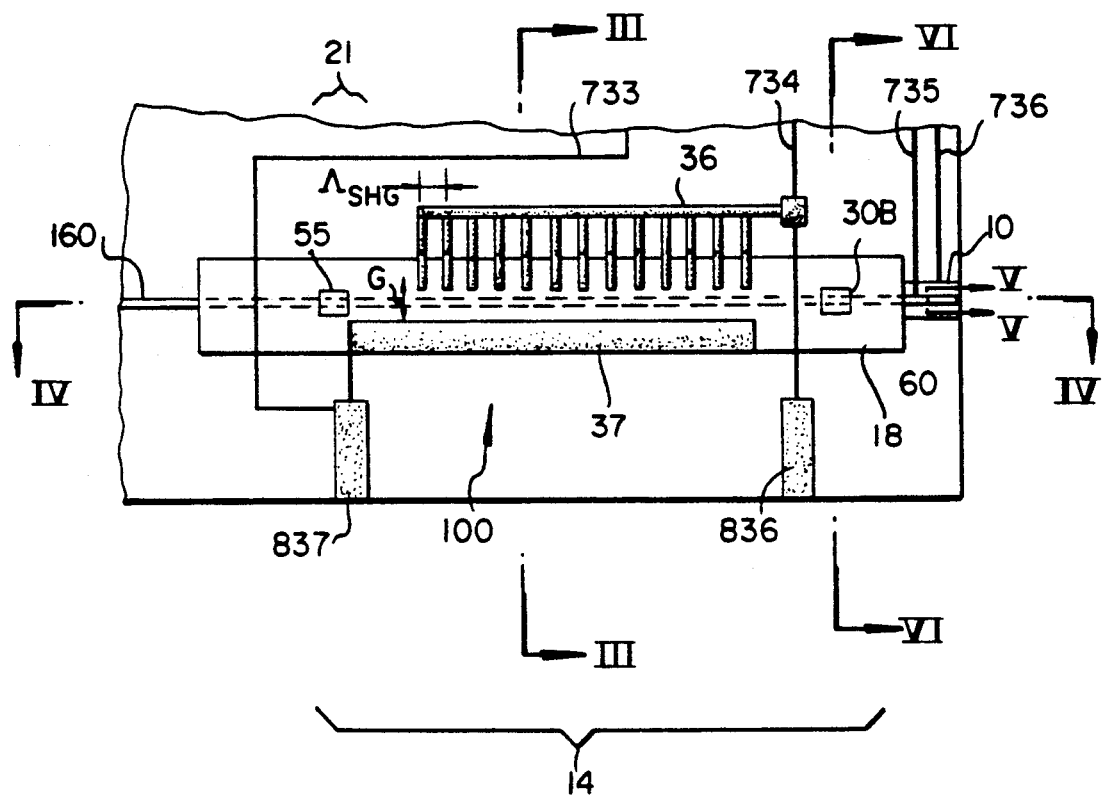
FIG. 2 is an enlarged view of a portion of FIG. 1 illustrating an extended cavity laser providing the functions of coupling the active laser diode to the nonlinear optic waveguide film, quasi-phase matched second harmonic generation, modulation and feedback of the infrared radiation using a distributed Bragg reflection grating.

FIG. 2 is a detailed plan view of the section of the integrated optic head, according to the present invention, which represents an extended cavity laser and provides second harmonic generation and modulation of the light. The extended cavity laser for radiation at the fundamental wavelength is formed of an active gain section 10 which also includes a back facet reflector, an extended optical cavity section 14, and a distributed Bragg reflector section 21. The active gain section 10 is coupled into a ridge waveguide 60 which is formed of NLO material. Buffer layer 18 is formed of a material such as polymethylmethacrylate having an index of refraction below that of the NLO ridge waveguide, a thickness from 0.5 to 5 microns, and a width of 10 to 1000 microns. This layer serves to optically isolate the NLO ridge waveguide from surface electrodes 36 and 37. These electrodes are formed of 0.1 to 0.3 microns thick films of gold or aluminum by means of photolithographic patterning.

Figure 3:
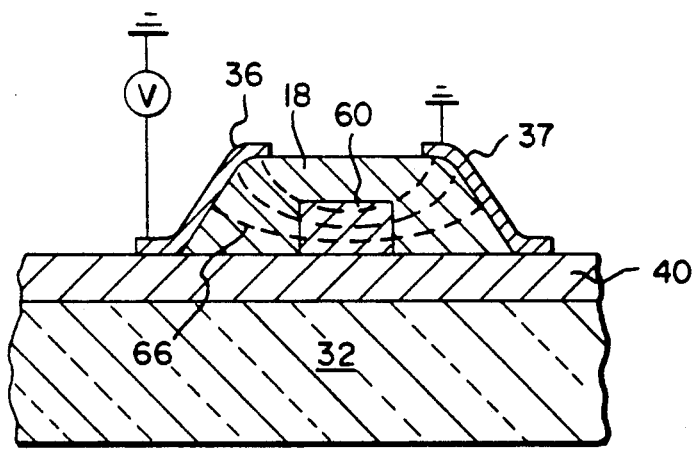
FIG. 3 is a sectional view taken along line III—III of FIG. 2 illustrating the fringing fields, designed to interact primarily with TE polarized light in the nonlinear optic organic channel waveguide due to the surface electrodes of the quasi-phase matched second harmonic generator.

The electrodes 36, 37 are used to periodically pole the NLO ridge waveguide. U.S. Pat. No. 5,058,970 discloses a nonlinear optic waveguide device incorporating a periodically poled structure. In this device, the electric fields were applied so that the domains were poled in a direction perpendicular to the waveguide plane and were consequently most efficient for SHG with TM-polarized light. However, in the present invention, periodic poling is provided by the fringing fields 66 of electrodes 36 and 37 as shown in FIG. 3. As can be seen from FIG. 3, the poling direction is parallel to the substrate plane. Consequently, TE-polarized light is most efficiently coupled by the periodically poled structure from the fundamental to the second harmonic wavelength. Light emanating from the active laser diode region 10 is predominantly TE-polarized.

The poling process is accomplished for the NLO polymer by heating the polymer to a temperature just below its glass transition and applying a DC voltage across poling pads 836 and 837. The polymer is cooled to ambient temperature with the field applied, after which time the field is removed. The length of the entire periodically poled region 100 is typically 1 to 30 mm and the period of the domains is given by the quasi-phase matching condition $$\Lambda_{SHG} = \frac{\lambda_B}{N_B - N_R} \quad (1)$$

where $\lambda_B$ is the wavelength of the second harmonic radiation and $N_B$ and $N_R$ are the effective indexes of refraction of the second harmonic and fundamental guided modes, respectively. Typical values of $\Lambda_{SHG}$ range from one to ten microns.

The electro-optic modulation function is obtained by using the same electrodes that were used for poling to apply a periodic electric field and by taking advantage of the linear electro-optic effect in the NLO channel waveguide. In this case, voltage drive signals are provided by integrated circuit 730 via interconnects 734 and 733 shown in FIG. 2. The periodically varying electro-optic phase shift induced by the applied voltage results in a deviation in the quasi phase-match condition as expressed in Equation (1) and a reduction in the second harmonic light output as taught by Mir in cofiled application Ser. No. 953,925, filed Sep. 29, 1992, the disclosure of which is incorporated herein by reference. Thus, the intensity of the second harmonic light can be varied from a maximum to zero as voltage applied across electrodes 36 and 37 is varied.

If the simplifying assumptions are made that the periodic fringing fields and the poled domains are uniform and parallel to the plane of the substrate and that Equation (1) is satisfied when the applied voltage is zero, it is straight-forward to show that the voltage required to turn off the SHG is given approximately by $$V_{OFF} \approx \left[ \frac{2G}{(n_B)^3 r_B - (n_R)^3 r_R} \right] \frac{\lambda_B}{L} \quad (2)$$

where G is the gap spacing between the electrode fingers of digitated electrode 36 and electrode 37; L is the length of the periodically poled region 100; $n_B$, $n_R$ are the indexes of refraction of the NLO material for the second harmonic and fundamental wavelengths, respectively; and $r_B$, $r_R$ are the linear electro-optic $r_{33}$ coefficients of the NLO material for the second harmonic and fundamental wavelengths, respectively. Equation (2) assumes that the guided optical fields are well-confined by the ridge waveguide. If the guided optical fields are not well-confined by the ridge waveguide, then the terms $(n_B)^3 r_B$ and $(n_R)^3 r_R$ must be multiplied by factors which are less than unity and which correspond to the overlap of the optical fields for the second harmonic and fundamental guided modes, respectively, with the ridge waveguide. As an example, $V_{OFF}$ computed from Equation (2) is found to be about 12 volts for the particular case where G=5 microns, $\lambda_B/L = 10^{-4}$, and $$((n_B)^3 r_B - (n_R)^3 r_R) = 82 \, pm/V.$$

Figure 4A:
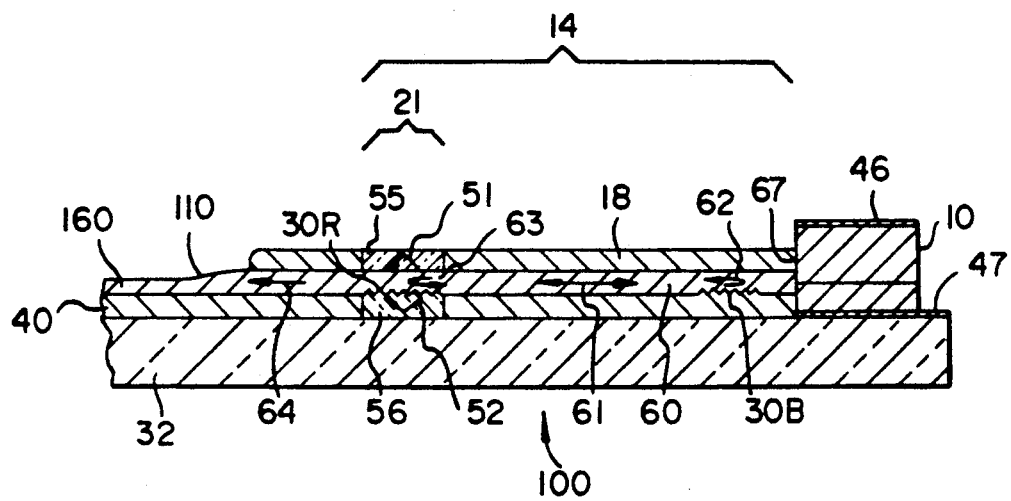
FIG. 4a is a sectional view taken along line IV—IV of FIG. 1 or FIG. 2.
Figure 4B:
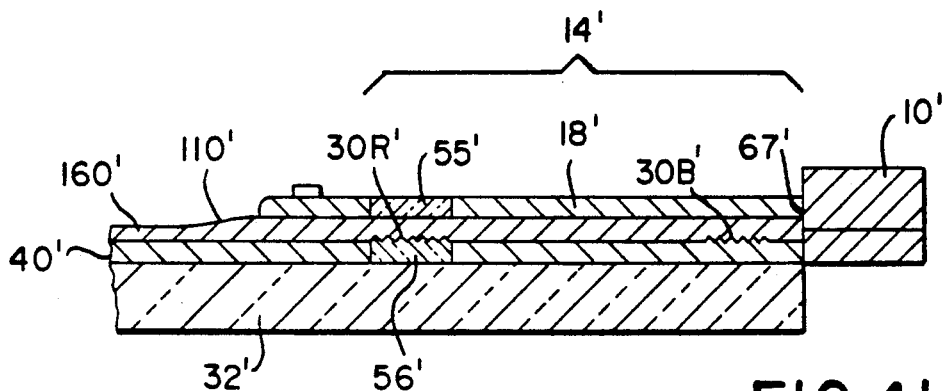
FIG. 4b is a sectional view, similar to FIG. 4a, but illustrating another preferred embodiment.
Figure 4C:
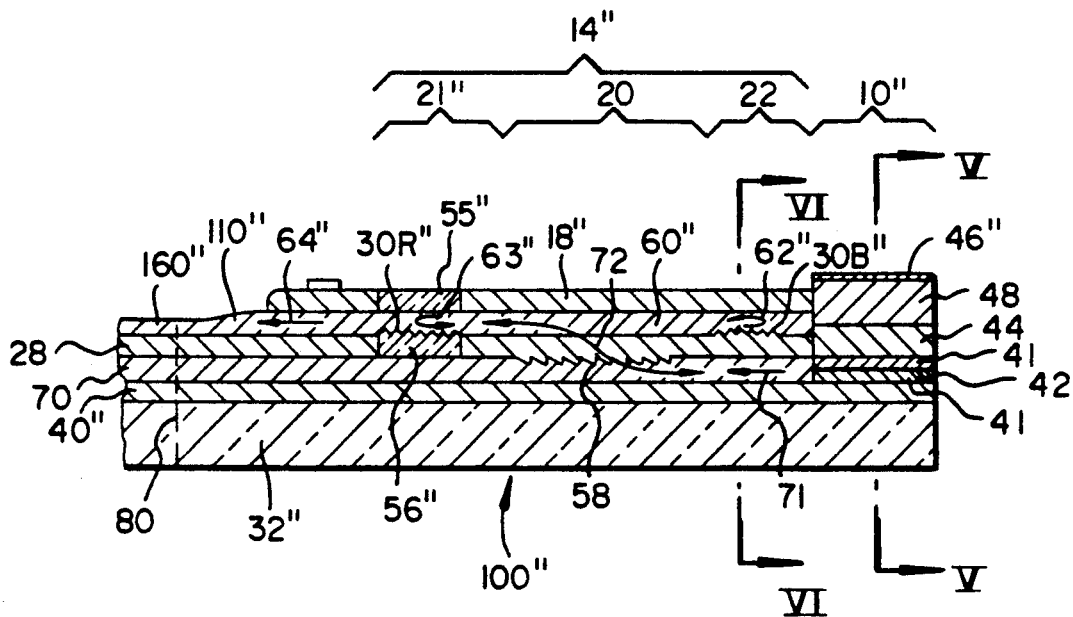
FIG. 4c is a sectional view, similar to FIGS. 4a and 4b, but illustrating another preferred embodiment.

FIGS. 4a, 4b, and 4c are cross-sectional views along line IV—IV of FIG. 2 for three different embodiments of the invention. These three figures represent alternative means for including the NLO waveguide second harmonic generator 100 in an extended cavity laser. As shown in FIG. 4a, light generated in active gain section 10 is coupled into NLO ridge waveguide 60 and the fundamental wavelength reflects at distributed Bragg reflector section 21. Reference numeral 63 represents the reflected fundamental beam in NLO ridge waveguide 60. The fundamental beam returns to the active gain section 10 where it is amplified and reflected back into the NLO ridge waveguide. Reference numeral 61 represents the fundamental wavelength resonating in the extended cavity laser. As the fundamental propagates back and forth through the periodically poled NLO ridge waveguide, a portion of this light is converted into the second harmonic wavelength. This radiation either propagates toward grating 30R in grating section 21, or it propagates toward distributed Bragg reflection grating 30B.

If the second harmonic propagates toward distributed Bragg reflection grating 30B, it is reflected back toward grating 30R as indicated by reference numeral 62. Second harmonic radiation incident on grating 30R is coupled out of NLO ridge waveguide 60 by this grating, reflected back toward the NLO ridge waveguide by transparent dielectric reflector stacks 55 and 56, and recoupled back into NLO ridge waveguide 60 by grating 30R. Reference numerals 51 and 52 represent second harmonic light that has been reflected by reflector stacks 55 and 56, respectively. Reference numeral 64 represents second harmonic light that has been coupled back into NLO channel waveguide 60 and is incident on the tapered coupler 110 between ridge waveguides 60 and 160.

FIG. 4a shows buffer layer 40 deposited on substrate 32 with ridge waveguide 60 formed between buffer layer 40 and buffer layer 18. Ridge waveguide 60 and buffer layer 18 are smoothly terminated along face 67 by means of reactive ion etching (RIE). Active gain section 10 is grown on a GaAs substrate. After cleaving and antireflection coating the front facet and cleaving and reflection coating the back facet, the laser diode is removed by means of the epitaxial lift-off technique as taught by L. Buydens, et al. *GaAs/AlGaAs Multiple-Quantum-well Vertical Optical Modulators on Glass Using the Epitaxial Lift-Off Technique*, Optics Letters, Vol. 16, No. 12, Jun. 15, 1991, pp 916-918, and placed on titanium-tungsten/gold bottom contact layer 47 which has been deposited on substrate 32. Active gain section 10 is positioned so that the laser is aligned to ridge waveguide 60. Electrical contract is made to metallic contact layers 46 and 47 via interconnects 735 and 736.

Gratings 30B and 30R are ion milled into buffer layer 40 and dielectric reflector stack 56, respectively, using a pattern formed by holographic lithography prior to deposition of the NLO waveguide layer 60. Grating 30R forms the distributive Bragg feedback reflection section 21 for the extended optical cavity for the fundamental wavelength with grating pitch given by $$\Lambda_R = \frac{\lambda_R}{2N_R} \quad (3)$$

where $\lambda_R = 2\lambda_B$ is the fundamental wavelength. Assuming $\lambda_R = 830$ nm and $N_R = 1.6$, a value of $\Lambda_R = 259$ nm is obtained from Equation (3). Grating 30B serves as a reflection grating to reflect back second harmonic radiation away from the active laser diode 10 and towards the receiving ridge waveguide 160. The pitch of grating 30B is given by $$\Lambda_B = \frac{\lambda_B}{2N_B}. \quad (4)$$

A value of $\Lambda_B = 122$ nm is obtained with $\lambda_B = 415$ nm and $N_B = 1.7$ using Equation (4). Only radiation at the second harmonic wavelength will be reflected by grating 30B because the pitch of this grating is too fine to interact with radiation at fundamental wavelength. Thus radiation at the fundamental wavelength returns back to couple into the active gain section 10 to complete the extended cavity laser.

Unfortunately, the pitch of grating 30R is such that radiation at the second harmonic wavelength is coupled out of ridge waveguide 60 and into both upper buffer layer 18 and lower buffer layer 40. The light coupled out of channel waveguide 60 exits at nearly normal angles to the plane of the substrate. These angle are given by the formula:

$$\sin\theta_{buf} = \frac{N_B - N_R}{n_{buf}} \quad (5)$$

where $\theta_{buf}$ and $n_{buf}$ are the angle of the light relative to the normal to the substrate and index of refraction, respectively, in either the upper or lower buffer layers and $N_B$ and $N_R$ are as previously defined. Using the values of $N_B$ and $N_R$ given above along with a value of $n_{buf} = 1.47$ gives a value of $\theta_{buf} = 3.9$ degrees according to Equation (5). Accordingly, thin film transparent dielectric reflector stacks 55 and 56 must be formed above and below NLO waveguide 60, respectively. Reflector stack 55 is positioned directly above grating 30R which is formed directly on reflector stack 56. It will be noted that ridge waveguide 60 tapers down in thickness in region 110 to become ridge waveguide 160. This is necessary so that ridge waveguide 160 will be single moded for radiation at the second harmonic wavelength.

FIG. 4b shows another embodiment of the extended laser cavity wherein the epitaxial lift off active laser diode section 10 is replaced by an endfire coupled active laser diode section 10'. As in the case of first embodiment described above with reference to FIG. 4a, active gain section 10' is formed with a cleaved and anti-reflection coated front facet and a cleaved and reflection coated back facet. The end facet 67' of extended cavity/second harmonic section 14' is made to be smooth by means of polishing and/or reactive ion etching.

FIG. 4c illustrates yet another embodiment for the extended cavity laser diode/second harmonic generator/modulator wherein the active gain section 10'' and the optical cavity extension 14'' are both formed monolithically a single GaAs substrate 32''. Furthermore, the active gain/back facet reflector section 10'' is coupled into a passive AlGaAs channel waveguide section 70 which is in turn coupled to the NLO ridge waveguide 60'' by means of a blazed, grating assisted, directional coupler section 20. The extended optical cavity is completed by the distributed Bragg reflector section 21''.

Light of the fundamental wavelength propagates from the active gain section 10'' to the passive AlGaAs waveguide 70 indicated by 71. It then couples to the NLO channel waveguide 60'' by means of the blazed, grating assisted, directional coupler 58. After reflection off of grating 30R'' indicated by 63'', the fundamental returns to AlGaAs passive channel waveguide 70 and couples back into the gain section 10" where it is amplified and reflected back towards the extended cavity. As the fundamental resonates back and forth in the periodically poled NLO ridge waveguide, indicated by reference numeral 72, second harmonic light is generated which either reflects at distributed Bragg reflector 30B", indicated by reference numeral 62, or is coupled out of and back into NLO ridge 60" by grating 30R" and reflector stacks 55" and 56". Reference numeral 64" represents output second harmonic light that is leaving section 100".

The active gain section 10" may, for example, be a graded index separate confinement heterostructure single quantum well (GRINSCH-SQW) structure, or a multiple-quantum well structure, or a channeled substrate planar large optical cavity (CSP-LOC), or possibly a transverse-junction-stripe laser with an external waveguide. It is important to note that if the same structure is used in both the active gain region 10" and in the passive unpumped channel waveguide 70 of region 14", then the unpumped passive channel waveguide 70 would represent excess optical loss. On the other hand, it is possible to modify the band gap in the passive channel waveguide 70 of region 14" to reduce the loss in this region. R. L. Thornton et al., *Monolithic Waveguide Coupled Cavity Lasers and Modulators Fabricated by Impurity Induced Disordering*, J. Lightwave Technology, Vol. 6, No. 6, pp. 786-792, (1988); K. Meehan et al., *Disorder of an $Al_xGa_{1-x}As$-GaAs Super Lattice by Donor Diffusion*, Apl. Phys. Lett., Vol. 45, pp 549-551, (1984); and R. L. Thornton et al., *Optoelectronic Device Structures Fabricated by Impurity Induced Disordering*, J. Crystal Growth, Vol. 77, pp. 621-628, (1986), teach a means whereby a buried active channel waveguide section comprised of a multi-quantum-well gain region is converted to a passive channel waveguide section by silicon impurity induced disordering (Si-IID). Obviously, such a process could also be applied to GRINSCH-SQW structures as well.

The active gain section 10" shown in FIG. 4c represents a typical GRINSCH-SQW structure. It can be appreciated that this represents only one example of several possible active-to-passive AlGaAs channel waveguide structures as mentioned above. Others include multiple quantum well heterostructures, CSP-LOC type structures, and transverse-junction-stripe laser structures with external passive waveguides. The GRINSCH waveguide layer 41 is shown upon the n-type AlGaAs cladding layer 40" which is itself formed on an n-type GaAs substrate 32". Embedded within the GRINSCH waveguide layer is the active GaAs quantum well layer 42. Upon GRINSCH waveguide layer 41 is p-type AlGaAs cladding layer 44. The GRINSCH waveguide layer is typically 0.2 to 0.8 microns thick with the active layer 42 being only 10 to 20 nm thick. The n and p cladding layers, 40" and 44, respectively, are each typically 1 to 2 microns thick. Upon the p-type cladding layer 44 is the p+ GaAs contact layer 48 which is approximately 0.1 to 0.5 micross thick. A gold-germanium/nickel contact layer 46" is deposited on layer 48. Electrical contact is made to the bottom of the active gain section 10" by local n+ doping of the substrate 32".

The passive waveguide region 14" includes a coupling region 22 that is a coupling region from the active gain region 10" to the unpumped passive region 14" of the AlGaAs waveguide 70. The optical energy of the beam propagating in the active gain region 10" is confined to a rather narrow layer, typically on the order of a few tenths of a micron. The impurity induced disordered AlGaAs waveguide 70 is designed to insure maximum coupling efficiency from active gain region 10" to passive region 70. The active to passive coupling region 22 is comprised of two separate waveguides as shown in FIG. 4c. Waveguide ridge 60" is composed of a NLO organic material below which is a buffer layer 28 composed of $SiO_2$ or other transparent low index of refraction material and is from 0.1 to 5 microns in thickness. The low index layer 28 separates the NLO waveguide from the passive AlGaAs channel waveguide section 70.

The passive waveguide region 14" also includes blazed, grating assisted, directional coupler section 20. Coupling region 20 is an example of a directional coupler made of nonidentical asymmetric waveguides using blazed grating assist. Such a grating is necessary to couple light between the severely mismatched waveguides 70 and 60". A similar grating assisted directional coupler is described by D. Marcuse, *Directional Couples Made of Nonidentical Asymmetric Slabs, Part II*, Journal of Lightwave Technology, Vol LT-5, No. 2, pp. 268-273 (1987). According to the article, the length of grating 58 required for 100% coupling efficiency of the light from channel waveguide 70 to ridge waveguide 60" or vice versa, depends on the thicknesses and indexes of refraction of the various layers, especially buffer layer 28. Typical values of the grating length for 100% coupling efficiency range from 0.5 mm to 5 mm. The pitch of grating 58 required to achieve the impedance match is given by the formula:

$$\Lambda_{DC} = \frac{\lambda_R}{N_R^{70} - N_R^{60}} \tag{6}$$

where $N_R^{70}$ and $N_R^{60}$ are the effective indexes of the guided fundamental modes in the passive channel AsGaAs waveguide 70 and the NLO ridge waveguide 60", respectively.

As an example, Equation (6) can be used to evaluate a typical value of the grating pitch for grating 58 if $\lambda_R$ is taken to be 830 nm, $N_R^{70}=3.35$, and $N_R^{60}=1.6$. In this case $\Lambda_{ADC}=474$ nm. It will be appreciated that the second harmonic wavelength will not be coupled back into AlGaAs passive channel waveguide 70 by the blazed grating-assisted directional coupler 58. This is true because the pitch of this grating as given by Equation (6) will not, in general, be equal to the pitch required to couple the second harmonic wavelength.

The need for blazing grating 58 arises because the pitch $\Lambda_{DC}$ is small enough that unblazed grating 58 also couples light into the substrate. It is known that high efficiency blazed gratings can selectively direct light out of a waveguide into a lower index of refraction cover region while coupling little, if any, light into a higher index of refraction substrate region. Efficiencies approaching 100% have been reported by M. Masumoto in *Analysis of the Blazing Effect on Second Order Gratings*, Technical Digest, Vol. 5, Integrated Photonics Research Conference, Paper WC-2, pp. 130-131 (1990). The present invention uses a blazed, grating assisted, directional coupler to selectively couple light from disordered AsGaAs waveguide 70 into a lower effective index NLO ridge waveguide 60" with little light going into the AlGaAs cladding layer 40". The blaze angle of the grating can be designed so that nearly 100% of the light is coupled into the NLO waveguide even though the effective index of refraction of the NLO waveguide is less than that of the AlGaAs lower cladding layer. The blazed grating can be formed by holographic lithography followed by directed etching using reactive ion etching or chemically assisted ion beam etching.

Figure 5:
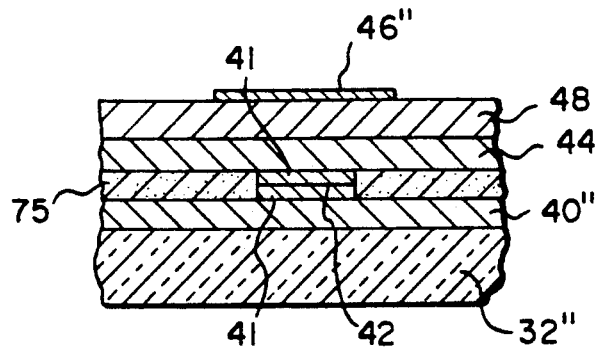
FIG. 5 is a sectional view taken generally along line V—V of FIG. 2 and specifically along line V—V of FIG. 4c illustrating the silicon impurity induced disordered laser diode structure.

Referring to FIG. 5, upon the n-type AlGaAs cladding layer 40" is the AlGaAs GRINSCH-SQW structure, 41 and 42. During the Si-IID processes, the gold-germanium/nickel contact layer 46" in the active gain region 10" acts as a mask and shields a central channel of the GRINSCH-SQW structure, 41 and 42. Thus, the active region 10" is disordered everywhere except in the channel region 41 where the active layer 42 is still intact. Silicon impurity induced disordered regions 75 are outside this shielded region.

Figure 6A:
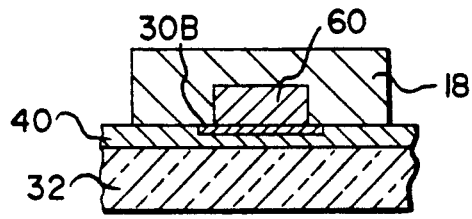
FIG. 6a is a sectional view taken generally along line VI—VI of FIG. 2 and specifically along line VI—VI of FIG. 4c.
Figure 6B:
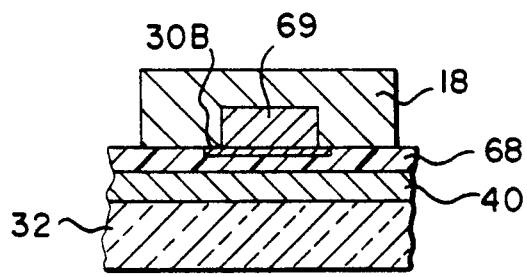
FIG. 6b is a sectional view, similar to FIG. 6a, but illustrating another preferred embodiment.
Figure 6C:
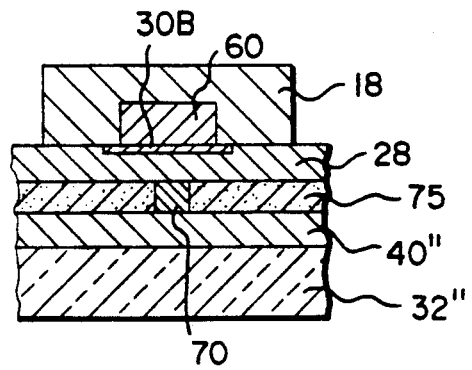
FIG. 6c is a sectional view, similar to FIGS. 6a and 6b, but illustrating another preferred embodiment.

FIGS. 6a, 6b, and 6c show three alternative NLO waveguide structures. In FIG. 6a, the NLO ridge waveguide 60 is formed by patterning a uniform NLO film by means of reactive ion etching or UV laser ablation. The NLO ridge is 0.5 to 2 microns in thickness and 1 to 5 microns in width. Also shown in FIG. 6a are the upper buffer layer 18 and the lower buffer layer 40. Grating 30B is ion milled into layer 40 prior to the formation of the NLO ridge waveguide and the deposition of the upper buffer layer.

In FIG. 6b, a planar NLO film 68 is deposited on buffer layer 40 and grating 30B is reactive ion etched or ion milled directly into this film. A ridge 69 is patterned on film 68. This ridge must be made of a material whose index of refraction is less than or equal to that of the NLO film yet greater than that of the buffer layer 18. This ridge could be made from the NLO material itself or the NLO material diluted with polymethylmethacrylate, for example. The thickness of this ridge is from 0.05 to 1 micron and serves to laterally confine light which propagates beneath it in NLO film 68.

FIG. 6c shows that the extended cavity laser/second harmonic generator/modulator is the monolithic AlGaAs disordered structure. In the case of the lower AlGaAs passive waveguide, the disordering process has been allowed to effect almost the entire layer so that only a residual region of partial disordering is left which corresponds to the narrow passive channel waveguide 70. In this way, the bandgaps of the partially disordered channel 70 and the fully disordered layer 75 are both lower than that of the active layer 42. On the other hand, the index of refraction of the partially disordered channel 70 is higher than that of the fully disordered layer 75. Because of these features, low loss propagation in channel waveguide 70 is possible.

The disordering in passive waveguide region 14" is accomplished at the same time as the disordering in the active gain region 10" mentioned in connection with FIG. 5. However, the metal masking layer is narrower for the passive waveguide region which permits the disorder profile to diffuse in from both sides of the mask. Note that after the Si-IID process, the metal mask portion over the passive waveguide section 14" must be etched off whereas the metal mask remains over the active gain region 10" and serves as upper contact electrode 46" (FIG. 5). After disordering has been accomplished and the metal mask removed, buffer layer 28 is deposited on top of layer 75 and grating 30B is patterned by holographic lithography and ion milled. NLO ridge waveguide 60 is formed on this layer from a uniform film of NLO material by means of reactive ion beam etching or UV laser ablation just as in the case of the embodiment shown in FIG. 6a. Upper buffer layer 18 is then deposited on top of NLO ridge waveguide 60. The NLO ridge 60 is typically 1 to 5 microns wide and 0.5 to 2 microns high whereas the AlGaAs passive channel waveguide 70 is only 0.05 to 1 micron wide and has a similar depth. Alternatively, any similar method or structure which defines a channel or ridge waveguide in the NLO and in which the guided optical field in channel waveguide 70 overlaps the NLO waveguide could be used to replace any of the three structures depicted in FIGS. 6a, 6b, and 6c.

The in-cavity SHG laser diode/modulator embodiment depicted in FIGS. 4c, 5, and 6c is a novel device in and of itself, and, as such, can stand alone as a compact blue light source. In that case, the device would terminate along dashed line 80 indicated in FIG. 4c. Furthermore, such an independent light source could replace active gain section 10' and extended cavity section 14' in FIG. 4b and endfire couple directly into channel waveguide section 160'. In this way, the necessity of having a large GaAs substrate 32" for the entire integrated optic head shown in FIG. 1 would be avoided. The entire integrated optic head, except for the blue light modulated source, could be built on a different substrate such as silicon or glass.

Figure 7:
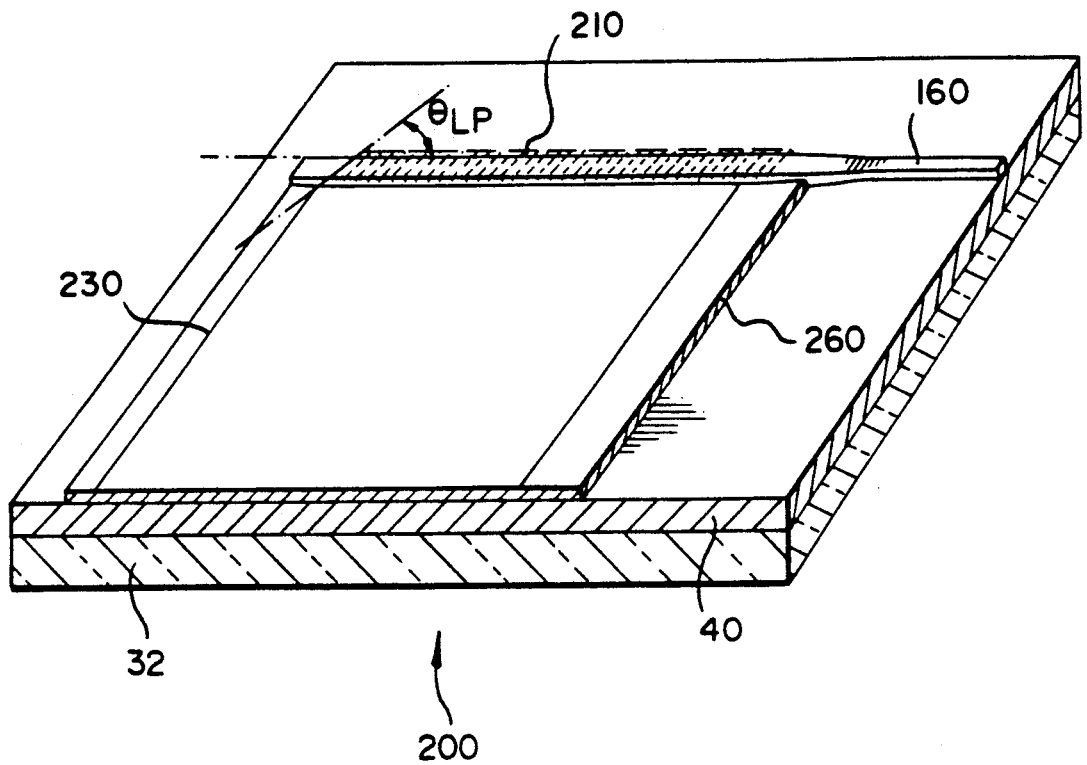
FIG. 7 is a detailed isometric view of the channel-to-planar waveguide grating coupler section according to the invention.

FIG. 7 is an enlarged isomorphic view of the ridge-to-planar coupler section 200. In this section, ridge waveguide 160 is formed so that, even though it is atop planar waveguide 260, light remains confined to the ridge in the absence of a grating coupler. Planar waveguide 260 is designed to support a single mode at the second harmonic wavelength which implies that the thickness of this waveguide must be from 0.1 to 1 micron depending on the exact value of the refractive index of the NLO material chosen. Grating coupler 210 both diffracts the light at a 90 degree angle and expands the light into guided beam 230 in planar waveguide 260. Such grating couplers are disclosed in U.S. Pat. No. 4,776,661.

Generally, the profile of the intensity of guided beam 230 will decrease exponentially along the length of grating coupler 210 if the grating groove depth of the grating coupler is uniform. However, the intensity profile can be made to be near Gaussian if the grating groove depth is varied along the length of the coupler as taught by L. Li, et al. *Variable-Groove-Depth Grating Couplers,* OSA Annual Technical Digest, 1991 (Optical Society of America, 1991), Vol. 17, p. 26). Another advantage of the 90 degree ridge-to-planar waveguide grating coupler is that it converts TE polarized light in ridge waveguide 160 to TM polarized light in planar waveguide 260 as has been shown by L. A. Weller-Brophy and D. G. Hall, *Local Normal Mode Analysis of Guided Mode Interactions with Waveguide Gratings,* Journal of Lightwave Technology, Vol. 6, No. 6, pages 1069–1082, June 1988.

Grating coupler 210 is formed on buffer layer 40 by holographic patterning and subsequent ion milling. This grating is formed beneath a portion of the region where ridge waveguide 160 intersects planar waveguide 260. The grating pitch is given by the formula:

$$\Lambda_{RP} = \frac{\lambda_B}{\sqrt{\{(N_{BR})^2 + (N_{BP})^2\}}} \quad (7)$$

where $N_{BR}$ and $N_{BP}$ are the effective indexes of refraction at the second harmonic wavelength for the mode guided in the ridge waveguide and the planar waveguide, respectively. The grating should be formed at an angle to ridge waveguide 160 which is given by the formula:

$$\tan\theta_{RP} = \frac{N_{BR}}{N_{BP}}.\tag{8}$$

Typical values of $N_{BP} \approx N_{BR} \approx 1.6$ and $\lambda_B = 415$ nm yields $\Lambda_{RP} = 183$ nm and $\theta_{RP} = 45$ degrees.

Figure 8:
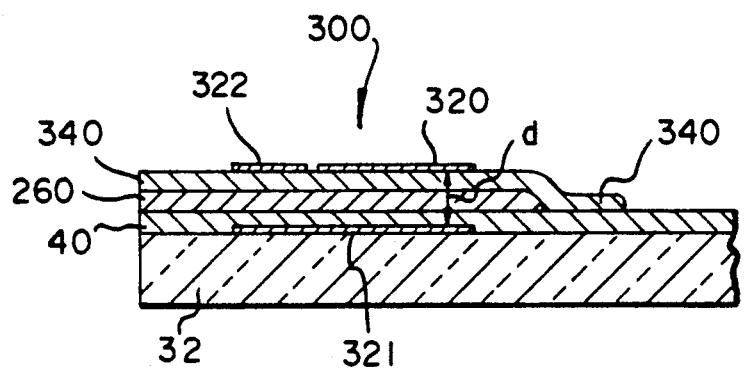
FIG. 8 is an enlarged sectional view taken along line VIII—VIII of FIG. 1.

FIG. 8 is a cross sectional view along VIII—VIII in FIG. 1 of the electro-optic waveguide deflector section 300. The construction and operation of section 300 is described in detail in application Ser. No. 916,422. Section 300 is formed by a planar NLO waveguide 260 which is atop a first transparent buffer layer 40 of refractive index less than that of the NLO waveguide. In turn, a second transparent buffer layer 340 with index of refraction lower than that of the NLO waveguide is atop the NLO waveguide. Buffer layer 340 can be any of a number of materials, such as pure polymethylmethacrylate or polymethylmethacrylate loaded with silicon dioxide, for example, and the thickness of buffer layer 340 is 0.5 to 5 microns. In section 300, a lower planar ground electrode 321 is positioned on the substrate below first buffer layer 40, NLO waveguide 260, and second buffer layer 340. A pair of spaced prism-shaped electrodes 320 and 322 are deposited atop second buffer layer 340 directly above ground plane electrode 321. Electrodes 320, 321, and 322 can be of a conductive metal such as gold or aluminum and from 0.1 to 0.3 microns in thickness. It is to be noted, however, that if the substrate 32 is silicon or some other semiconductor, electrode 321 could be replaced by a local heavily n-doped contact region.

The NLO polymer waveguide is electrically poled by temporarily shorting electrodes 320 and 322 and heating the polymer to a temperature just below its glass transition while applying a DC voltage across poling pads 841 and 842 which are shown in FIG. 1. Poling pads 841 and 842 are connected directly to electrodes 321 and 322, respectively. The polymer is cooled to ambient temperature with the field applied, after which time the field is removed and the short between electrodes 320 and 322 is removed. This process results in the poling axis of the NLO film being oriented normal to the plane of the film.

Voltages selectively applied between the planar ground electrode 321 and the pair of spaced electrodes 320, 322 causes the guided beam to deflect according to the geometrical configuration of the pair of spaced electrodes where the deflection angle is given by the formula:

$$\theta_{DEF} \approx 2\frac{\Delta N}{N_{BP'}}\tan\Gamma \tag{9}$$

where $\theta_{DEF}$ is the deflection angle of the collimated beam 230 in the waveguide, $\Delta N$ is the electro-optically induced change in the effective refractive index, $N_{BP'}$ is the effective refractive index of the guided mode in waveguide 260 in the deflector section 300, and $\Gamma$ is the apex angle of the surface electrode prisms 320, 322 shown in FIG. 1. $\Delta N$ is related to the applied voltage by the expression:

$$\Delta N \approx \frac{n_B^3}{2}r_B\frac{V_{DEF}}{d} \tag{10}$$

where $n_B$ and $r_B$ are as previously defined and $\pm V_{DEF}$ is the deflector voltage applied between electrodes 320 and 321 and supplied by integrated circuit 720 via interconnects 722 and 723. Simultaneously $\bigcirc V_{DEF}$ is applied across electrodes 322 and 321 and supplied via interconnects 721 and 723. The distance, d, is the total distance between the surface electrodes 320, 322 and the ground electrode 321. It will be appreciated that the TM polarization of the light propagating in NLO waveguide 260 permits advantage to be taken of the large linear electro-optic constant, $r_{33}$, of the vertically poled NLO waveguide. Assuming values of $\tan\Gamma = 4$, $r_B = 30$ pm/V, $n_B \approx N_{BP'} = 1.6$, $V_{DEF} = \pm 100$ volts and $d = 5$ microns yields a value of $\theta_{DEF} = \pm 6.2$ mrad from Equations (9) and (10). This deflection angle corresponds to $\pm 15$ tracks for a typical optical disk with a track pitch of 2 microns and a 3 mm focal length objective lens.

Figure 9A:
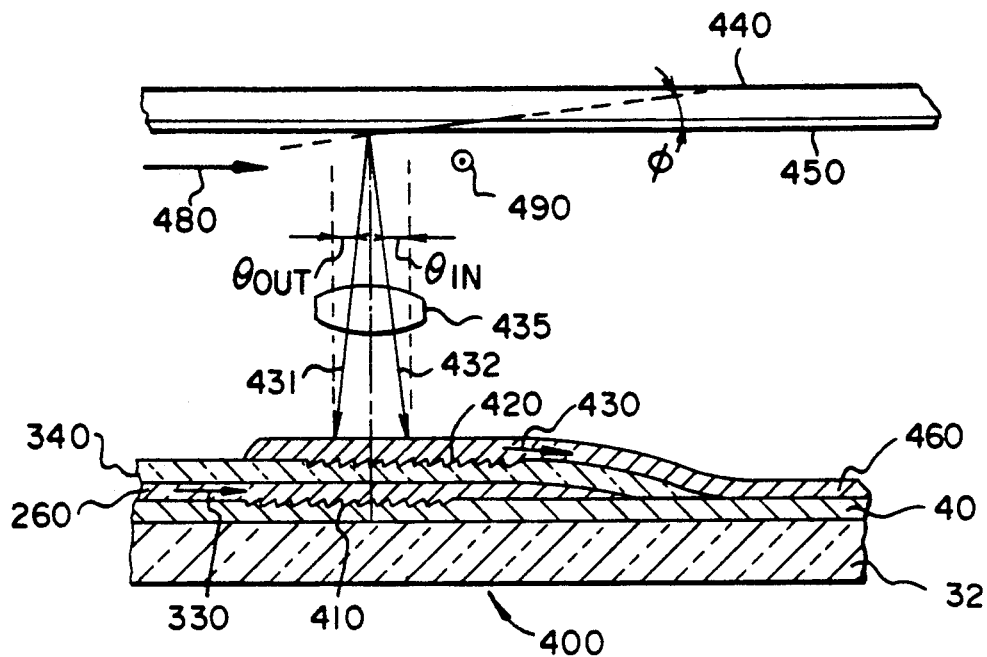
FIG. 9a is a sectional view along IX—IX in Figure 1 illustrating the objective lens and optical disk.

Referring to FIG. 9a, section 400 is the output/input coupler section. It is comprised of a first NLO waveguide 260 which is atop a first buffer layer 40, a first blazed, linear grating, output coupler 410 formed on first buffer layer 40, a second transparent buffer layer 340 with index of refraction less than that of the NLO waveguide 260 atop the blazed linear grating 410 and first NLO waveguide 260, a second NLO waveguide 460 atop the second buffer layer 340, and a second blazed, linear grating, input coupler 420 on second buffer layer 340. First NLO waveguide 260 and second buffer layer 340 are tapered to zero thickness after the first grating coupler. Blazed gratings 410 and 420 are formed by holographic lithography followed by reactive ion etching at an oblique angle to the surface to achieve the desired blaze. Grating 410 is blazed so that nearly 100% of guided beam 330 incident upon it will be coupled out of first NLO waveguide 260 with no light coupled into the substrate. Likewise, grating 420 is blazed so that all of the light incident upon it from the disk will be coupled into beam 430 in second NLO waveguide 60 with no light going into the substrate.

The pitch of output grating 410, $\Lambda_{OUT}$, is designed so that light is coupled out of first NLO waveguide 260 into air in some predetermined direction 431. This direction is at an angle $\theta_{OUT}$ which is nearly normal to the substrate 32. $\Lambda_{OUT}$ is related to the output angle $\theta_{OUT}$ according to the following formula:

$$\Lambda_{OUT} = \frac{\lambda_B}{N_{BP'} - \sin\theta_{out}} \tag{11}$$

where $N_{BP'}$ is the effective refractive index of the guided mode in NLO waveguide 260 in section 400. For an output angle in air of 5 degrees, $N_{BP'} = 1.6$, and $\lambda_B = 415$ nm, the grating pitch $\Lambda_{OUT}$ is 274 nm.

Beam 330 is coupled out of NLO waveguide 260 by blazed grating coupler 410 propagates along direction 431 in air through objective lens 435 and is focused onto the information bearing surface 450 of rotating optical disk 440. Recorded data in the form of pits and land areas lies along tracks (not shown) which are parallel to the direction 480 in FIG. 7. Note here that runout of the disk as it rotates is along direction 490. Deflection of guided beam 330 by the electro-optic deflector 300 causes the outcoupled beam to be deflected in a direction parallel to 490 which is opposed to the runout motion thus compensating for the disk runout.

The pitch of second blazed grating coupler 420 is designed so that light reflected from optical disk 440 along direction 432 is coupled into beam 430 in the second NLO waveguide 460. Direction 432 is oriented at an angle $\theta_{IN}$ with respect to the normal to the substrate 32. If the optical disk 440 is tilted by an angle $\Phi$ with respect to the substrate 32, the pitch for input grating 420 is given by the equation:

$$\Lambda_{IN} = \frac{\lambda_B}{N_{BP}{}'' - \sin\theta_{IN}} \quad (12)$$

where $N_{BP}{}''$ is the effective refractive index of the guided mode in NLO waveguide 460 and $\theta_{IN}$ is given by the equation:

$$\theta_{IN} = \theta_{OUT} + 2\Phi. \quad (13)$$

By adjusting the tilt angle, $\Phi$, the pitches of the two gratings can be made different enough that light coupled out of the first waveguide 260 by the first grating coupler 410 cannot be coupled directly into the second waveguide 460 by the second grating coupler 420. Thus, the source is effectively isolated from the sensor section 600. It can also be appreciated that laser feedback is also eliminated by the geometry of the device construction. If the surface of the optical disk 450 is parallel to the substrate 32, then $\Phi = 0$ and, according to Equation (13), $\theta_{IN} = \theta_{OUT}$. From Equation (12) it can be seen that the required pitch of grating 420 is identical to the pitch of grating 410 given by Equation (11) assuming that the effective index of NLO waveguide 460 is the same as that of 260. It is possible that the difference in blaze angles of gratings 410 and 420 will by itself result in isolation of the laser source and the detector.

It should be noted that if substrate 32 is transparent, an alternative construction for output/input coupler section 400 is to fabricate NLO waveguide 460, blazed input grating coupler 420, and Mach-Zehnder interferometer wavefront sensor section 600 on the bottom side of substrate 32. Note that in this alternate embodiment, beam reflector 500 is not required. In this alternative embodiment shown in FIG. 9b, where elements similar to elements of FIG. 9a are designated with the letter "a", it is not necessary to extend buffer layer 340 into section 400. The fabrication of this embodiment can be further simplified by forming a transmitter portion of the device which includes the source/electro-optic modulator section 100, the beam expander/TE-TM converter/reflector section 200, the electro-optic waveguide deflector section 300, waveguide 260, and blazed output grating coupler 410 on the top surface of transparent substrate 32. A receiver portion of the device which includes NLO waveguide 460, blazed input grating coupler 420 and Mach-Zehnder interferometer wavefront sensor section 600 are formed on the bottom surface of transparent substrate 32.

Figure 9B:
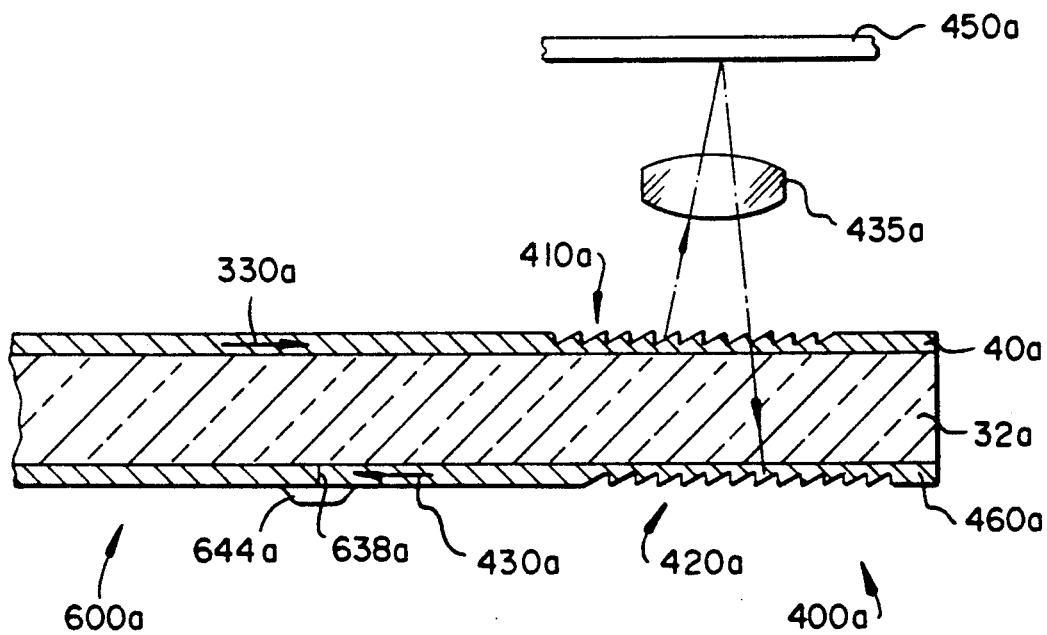
FIG. 9b is a sectional view similar to FIG. 9a but illustrating another preferred embodiment with a transparent substrate.
Figure 9C:
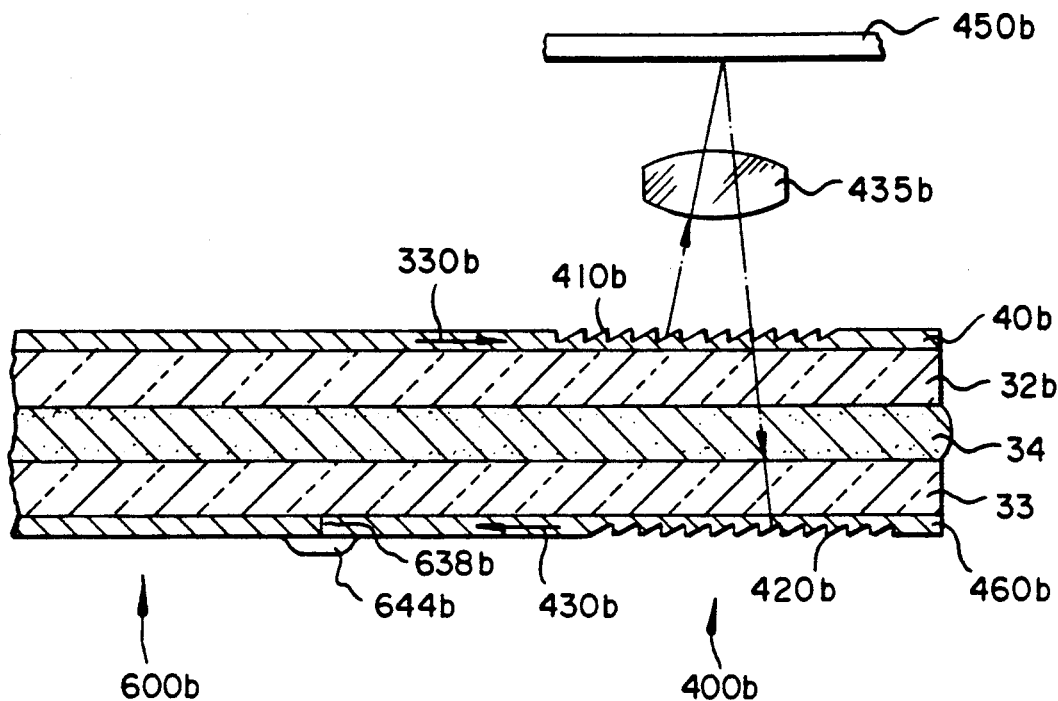
FIG. 9c is a sectional view similar to FIGS. 9a and 9b, but illustrating another preferred embodiment.

Alternatively, the receiver portion of the device could be formed on a separate substrate 33 as shown in FIG. 9c. In this alternative embodiment, elements similar to elements in FIG. 9a are designated with the letter "b". The two substrates could then be positioned back-to-back so that the output coupler 410 on top of substrate 32 is aligned with the input coupler 420 on the bottom of substrate 33 and bonded with an index matching adhesive 34.

It can be appreciated that in the alternative embodiments depicted in FIGS. 9b and 9c, the grating pitch of the input coupler grating 420a or 420b causes the incoupled beam to propagate in the reverse direction 430a or 430b, respectively. This allows either device to be made compact without the need for beam reflector 500. Another advantage of these embodiments relative to the embodiment shown in FIG. 9a is that the pitch required for input coupling grating 420a or 420b is different from the pitch required for grating 410a or 410b even if the disk tilt angle is zero. The pitch required for grating 420a or 420b is given by $$a,b \quad (12a)$$

$$\Lambda_{IN} = \frac{\lambda_B}{N_{BP}{}'' + \sin\theta_{IN}}. \quad (12a)$$

Note that Equation (12a) differs from Equation (12) in that the minus sign appearing in the denominator of Equation (12) has been replaced by a plus sign in Equation (12a). Thus, the disk does not have to be tilted to achieve optical isolation of waveguides 40a or 40b and 460a or 460b because these waveguides are isolated by virtue of different grating pitches $\Lambda_{OUT}$ and $$a,b$$

$$\Lambda_{IN}.$$

Figure 10:
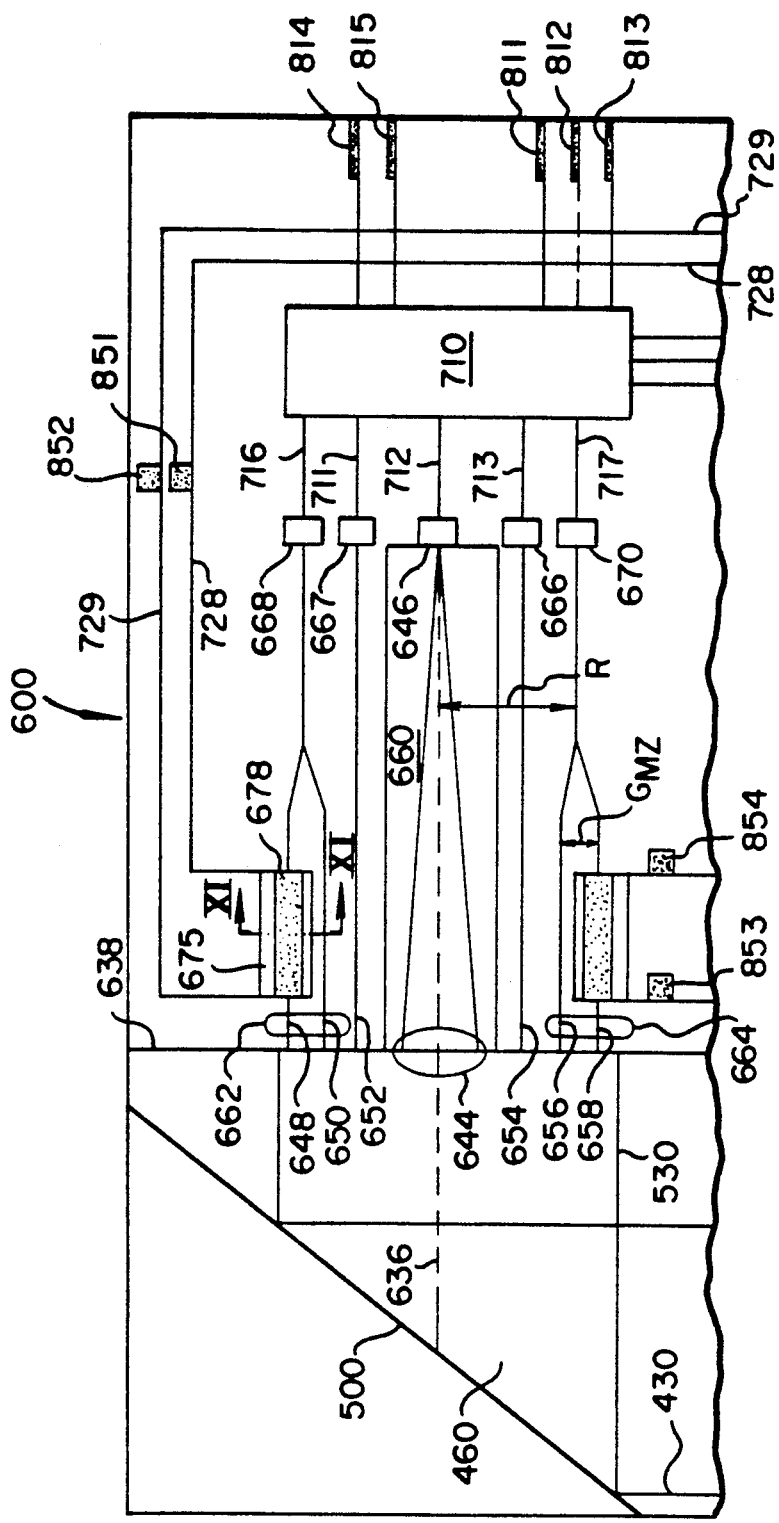
FIG. 10 is an enlarged view of a portion of FIG. 1 illustrating the section which provides the functions of sensing the focus error, tracking error, and data signals.

FIG. 10 is an enlarged plan view of end facet reflector 500 and the Mach-Zehnder (MZ) interferometer phase front sensor section 600. Facet reflector 500 is formed by dicing and polishing the substrate 32, buffer layer 40, and waveguide 460, or, alternatively, by reactive ion etching waveguide 460 only along a line which makes a 45 degree angle with the propagation direction of the light 430 coming from output/input section 400. In either case, the waveguide termination acts as a mirror and reflects the guided beam through an angle of 90 degrees enabling the total optical head to be made more compactly. The reflectivity of the facet can be enhanced by coating it with a reflection stack or a metallic mirror. It should be noted that the need for beam reflector 500 is eliminated if the embodiments of FIGS. 9b or 9c are used.

As shown in FIG. 10, after reflection from end facet reflector 500, beam 530 is incident on MZ wavefront sensor section 600. This section represents the receiver section of the integrated optic head and is described fully in application Ser. No. 913,579. The sensor section 600 is formed of a system of planar and channel or ridge waveguides which are atop first transparent buffer layer 40. Reference numeral 638 represents the boundary between NLO planar waveguide 460 and the MZ wavefront sensor section 600. Preferably, these waveguides are defined photolithographically and processed by means of reactive ion etching or are written directly with UV laser ablation.

The system of waveguides is comprised of a central planar waveguide region 660 with a mode-index condenser lens 644, the center of which lies on the optical axis 636 of the MZ wavefront sensor section. This lens focuses light onto photodiode 646 for measurement of the RF data signal. This signal is relayed to integrated circuit 710 via electrical interconnect 712. Symmetrically disposed on either side of the central planar waveguide region 660 are ridge waveguide MZ interferometers 662, 664 and reference ridge waveguides 652, 654. Ridge waveguide MZ interferometer 662 is comprised of individual ridge waveguides 648 and 650 which merge to form a Y-junction. Likewise ridge waveguide MZ interferometer 664 is comprised of ridge waveguides 656 and 658. The ridge waveguide MZ interferometers 662, 664 are used to sense decollimation of the incident beam. This decollimation is related to motion of the optical disk surface away from nominal focus of the objective lens.

Figure 11:
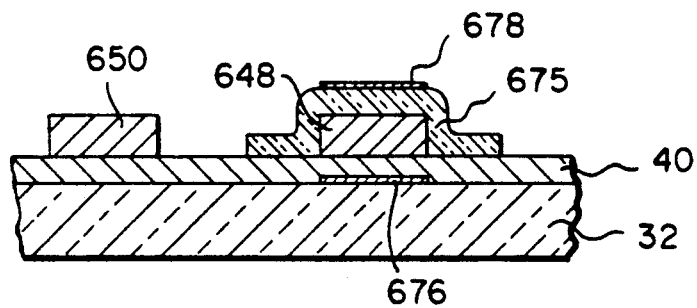
FIG. 11 is a sectional view taken along XI—XI of FIG. 10.

FIG. 11 represents the schematic cross section of a single channel waveguide MZ interferometer along line XI—XI of FIG. 10. As shown, buffer layer 40 lies directly below the ridge waveguide MZ interferometer. A metal ground electrode 676 in the form of a 0.1 to 0.3 micron thick film of gold, aluminum or other metal is deposited on substrate 32 below one ridge 648 of the MZ interferometer. It is to be noted here, as elsewhere throughout this disclosure, that if the substrate 32 is silicon or some other semiconductor, any metal conductor deposited directly on the substrate can be replaced by a local heavily n-doped contact region. A second transparent buffer layer 675 and an upper electrode 678 are deposited on NLO ridge waveguide 648. NLO ridge waveguide 648 is poled in a direction normal to the plane of the electrodes by applying the poling voltage across poling pads 851 and 852 which are connected electrically to electrodes 676 and 678, respectively. Pads 853 and 854 are similarly used to pole the NLO ridge in MZ interferometer 664. The NLO ridge waveguide is heated to a temperature slightly below the glass transition temperature, followed by slow cooling, and finally by removal of the poling voltage.

Referring again to FIG. 10, it is seen that voltage signals from integrated circuit 710 applied between electrodes 676 and 678 via electrical interconnects 728 and 729, respectively, cause electro-optically induced changes in index in NLO ridge 648 which permits the phase shift of light propagating in NLO ridge waveguide 648 to be varied relative to the phase shift of light propagating in NLO ridge waveguide 650. By this means MZ ridge waveguide interferometers 662 and 664 are biased electro-optically by phases of +90 degrees and −90 degrees, respectively. The focus error signal, $I_{FES}$, of incident beam 530 is obtained from the difference in the ratios of the signals from photodiode 668 and photodiode 670 divided by the signals from photodiodes 667 and 666. Photodiodes 668 and 670 sense the light emanating from MZ ridge waveguides 662 and 664, respectively, while photodiodes 667 and 666 sense light emanating from reference ridge waveguides 652 and 654, respectively. Signals from photodiodes 667, 666, 668, and 670 are relayed to integrated circuit 710 via electrical interconnects 711, 713, 716, and 717, respectively. If substrate 32 is made of silicon or some other semiconductive material, photodiodes 646, 666, 667, 668, and 670 can be integrated directly into the substrate as disclosed in U.S. Pat. No. 4,672,187. Otherwise, waveguided light can be coupled into external discrete photodetectors by means of grating coupling, endfire coupling, or evanescent wave coupling.

$I_{FES}$ is related to the defocus, $\Delta$, which is the distance that the optical disk has moved away from the nominal focal point of the objective lens by the following equation:

$$I_{FES} \approx 2\sin\frac{2\pi\Delta}{A} \tag{14}$$

where A is given by the relationship:

$$A = \frac{\lambda_B f^2}{2RG_{MZ}} \tag{15}$$

where R is the distance of the a MZ ridge waveguide interferometer from the optical axis 636, $G_{MZ}$ is the separation of the two ridge waveguides which comprise the MZ interferometer, and f is the focal length of the objective lens 435. Thus, $I_{FES}$ represents the focus error signal and varies sinusoidally with the defocus, $\Delta$. However, if the quantity A is made large enough relative to the largest value of $\Delta$, then Equation (14) can be expressed as $$I_{FES} \approx \frac{4\pi\Delta}{A} \tag{16}$$

so that $I_{FES}$ varies linearly with defocus. If it assumed that f=4 mm, $G_{MZ}$=10 microns, R=1 mm, and $\lambda$=415 nm then a value of A=332 microns is obtained from Equation (15). In this particular example, $I_{FES}$ should remain approximately linearly related to defocus for $|\Delta|<30$ microns.

Four desired effects can be achieved simultaneously by biasing the two MZ interferometers 662 and 664 and using the differential of the ratio of interferometer to reference signals as FES. First of all, DC level suppression is achieved. Second, fluctuations in the signals from each of the interferometers separately, arising from pointing variations in incident beam 530, cancel out in $I_{FES}$. The beam pointing variation is due to the electro-optic beam deflection during tracking error correction operation. A third benefit is that $I_{FES}$ is also immune to variations in input coupling efficiency of blazed grating input coupler 420 which arise from electro-optic tracking error correction. The fourth benefit is that $I_{FES}$ varies linearly with defocus assuming sufficiently small defocus relative to the parameter A given above.

Also, an additional advantage is derived as a result of the bias phase shifts being electro-optically adjustable. Dynamic adjustments can be made in the bias offsets should they drift from the nominal ±90 degrees. A less desirable, albeit less complex, alternative to the electro-optically adjustable bias offsets is to introduce bias phase shifts by permanently adjusting the thicknesses of the NLO ridge waveguides 648 and 658. This can be accomplished during manufacture of the device using laser trimming of the NLO organic polymer in waveguides 648 and 658 while monitoring the signal level of photodiodes 668 and 670. This permanently modifies the effective refractive indexes of ridge waveguides 648 and 658 relative to the effective refractive indexes of ridge waveguides 650 and 656, respectively, and gives rise to the desired phase biases.

The tracking error signal can be obtained from the differences in signals detected by the reference ridge waveguide photodiodes 667 and 666 expressed as:

$$I_{TES} = I_{02} - I_{01} \tag{17}$$

where $I_{02}$ and $I_{01}$ are the signals measured by photodiodes 666 and 667, respectively. An undesirable side effect is the variation in grating coupling efficiency with defocus. Modulation of the RF signal, due to defocus, at frequency components below a few kHz can be eliminated from the RF data signal by passing this signal through a high passband electrical filter. However, the frequency spectrum of $I_{TES}$ is the same as that of $I_{FES}$ so that electronic filtering is not an option. On the other hand, because $I_{FES}$ is immune to variations in coupling efficiencies, as mentioned above, $I_{FES}$ could be used as an input signal to a variable-gain circuit which can be used to compensate for the effects of defocus on $I_{TES}$.

It can now be appreciated that there has been described a read/write optical head that is much smaller in size and weight than conventional optical heads. The dimensions are on the order of 25 to 30 mm in length by 10 to 15 mm in width by 1 to 5 mm in thickness. It incorporates all of the functions of conventional read/write heads save the objective lens, focus servo, and coarse track seeking actuator. The use of the in-cavity SHG permits much higher conversion efficiencies than prior art devices because it permits SHG over multiple passes rather than single pass operation. Two of the embodiments described herein have the additional advantage that the active gain section of the extended laser cavity is monolithically formed onto the chip. The ease of fabrication avoids the need for labor intensive alignment of an external gain section with optical head chip. In addition, one embodiment actually allows for growth of an active gain section on the same substrate as an extended cavity thus reducing optical loss at the active-passive interface by taking advantage of a blazed, grating-assisted, directional coupler. The fact that blue light is used rather than infrared means that the storage capacity of the disk can be increased by a factor of four. The use of dual output/input linear blazed linear grating couplers allows for near-perfect elimination of laser feedback noise without the need for external quarter-wave plate. The use of distributed feedback SHG combined with the linear gratings of the output coupler eliminates spot quality deterioration and wander on the disk due to wavelength shift of the source as is the case in prior art designs with focusing grating output couplers. Also, the use of the Mach-Zenhder interferometer head eliminates the need for difficult to fabricate, high performance, integrated optic waveguide lenses.

The present invention is concerned with near-fully integrated optic waveguide read/write heads which are based on nonlinear optic poled organic polymer thin film waveguides or any other thin film nonlinear optic material. Such films are characterized by several desirable properties which enable the formation of multiple passive and active waveguide components on substrates such as silicon or GaAs, thus permitting electro-optic/opto-electronic integration. The present invention includes provisions for integration of nearly all of the key components of an optical read/write head on a single waveguide chip while overcoming problems set forth above.

The invention may be briefly summarized as being comprised of a substrate, an optically transparent lower buffer layer atop the substrate, an optically transparent nonlinear optic organic poled polymer waveguide atop the lower buffer layer with an index of refraction which is greater than that of the buffer layer, and a GaAs laser diode which is optically coupled to the NLO waveguide. In one embodiment the laser diode, an end facet of which has been cleaved and anti-reflection coated, is deposited on the substrate by means of a lift-off process and coupled into the NLO waveguide. In this embodiment the substrate could be glass or $SiO_2$-coated silicon. Alternatively, the substrate may be a GaAs chip, in which case, the laser diode could be formed directly on the substrate itself.

The NLO waveguide itself is comprised of six distinct but contiguous sections, including 1) a ridge waveguide section that forms an extended resonator cavity for the laser diode and combines the functions of modulation and in-cavity quasi-phase matched second harmonic generation; 2) a grating coupled ridge-to-planar waveguide section which combines the functions of beam expansion, TE TM conversion, and beam turning; 3) a planar surface prism electrode section for electro-optic waveguide beam deflection; 4) a dual linear grating section for output/input coupling; 5) a planar waveguide mirror section for beam turning; and 6) an electro-optic ridge waveguide Mach-Zehnder interferometer wavefront sensor section for TES and FES generation.

Included in the wavefront sensor section is also a planar waveguide region upon which has been formed a mode-index waveguide condenser lens. This lens collects light for data detection. In addition to these optical elements are electronic elements such as photodetectors, amplifiers, drivers, and logic elements which can be custom integrated directly in the substrate (in the case of semiconductor substrates such as silicon or GaAs) or attached to the substrate (in the case of glass of other insulating substrates). These electronic elements provide means of detecting the light; amplifying the FES, TES, and data signal; driving the electro-optic tracking actuator, driving the electro-optic modulator, and providing bias offset correction signals to the Mach-Zehnder interferometers.

Addition of an external objective lens, a coarse track-seeking actuator, and a focus actuator to the integrated optic chip described above forms a complete optical read/write head. Because the integrated optic chip is comprised of several sections that generate, guide, respond to, and manipulate a beam of light, each section can differ considerably from what is described herein as long as the function is the same. These sections make possible mass production and interchangeability of parts for tailoring a device to a particular use.

The present invention overcomes the difficulties of prior devices by using a novel integrated optic head which incorporates NLO organic poled polymer thin films, although any thin film nonlinear optic medium could be used in place of the organic polymer. The full potential of NLO organic materials can be realized when the material shaping allows for waveguided propagation as disclosed by J. Zyss *Non linear Organic Materials for Integrated Optics: A Review*, Journal of Molecular Electronics, Vol. 1, pp. 25–45, (1985). Examples of NLO organic materials useful in optical communications, laser scanning and control functions and integrated optics technology are known. See, for example, David J. Williams *Organic Polymeric and Non-Polymeric Materials with Large Optical Nonlinearitis*, Agnew. Chem. Int. Ed. Engl., Vol. 23, pp. 690–703, (1984).

Advantage is taken of the nonlinear optical properties of NLO organic films to obtain both second harmonic generation and the linear electro-optic effect. In contrast to bulk inorganic NLO materials, thin films of these materials offer design flexibility which enable integration of a variety of devices on the same substrate. For example, such films can be deposited on substrates such as silicon or GaAs, and can be fashioned into planar, ridge or channel waveguides thus permitting integration of nonlinear optic (i.e., second harmonic generation, electro-optic tracking, and electro-optic modulation) and opto-electronic (i.e., lasing and light detection) functions. Another advantage of the NLO organic materials is that they can have electro-optic coefficients which equal or exceed those of the best inorganic electro-optic materials. The fact that planar electrodes can be placed on either side of these thin nonlinear optic films, together with the relatively large electro-optic coefficients of NLO materials, permit the design of uniform-field electro-optic waveguide devices such as deflectors, phase-shifters, mode converters, and modulators which operate at relatively low drive voltages. Such designs are not possible when conventional bulk electro-optic crystals are used.

It can also be appreciated that nonlinear optical functions such as second harmonic generation and the linear electro-optic effect become more efficient the higher the power density. Waveguided structures are advantageous because they present the possibility of maintaining a over theoretically infinite path, in the case of a lossless medium, optical power transversely confined over dimensions on the order of the wavelength. Such is not possible for bulk interactions where, the stronger the focus, then the smaller confocal parameter beyond which the nonlinear optical conversion efficiency and the linear electro-optic effect are reduced. Another advantage of waveguided configurations is that for a given fundamental wavelength, it is possible to actually insure phase matching of the fundamental and the second harmonic guided modes either by the use of periodically poled quasi-phase matching gratings or by tailoring the waveguide characteristic features, such as thickness, indexes of layer and/or substrate, jointly or independently, to control the effective indexes of the fundamental and second harmonic guided modes.

Inclusion of a built-in SHG function in an integrated optic pick-up head offers a significant advantage over bulk prior art devices. This follows from the fact that information packing density on the optical disk increases as the inverse square of the wavelength of the radiation used to write the information. The integration of SHG offers the additional advantage that conversion occurs only at the fundamental wavelength for which the phase matching condition is satisfied. This means that the wavelength of the SHG light is insensitive to laser diode drift. This wavelength stability along with the use of a linear grating coupler instead of a curved focus grating coupler eliminates drift and deterioration of the focused spot at the disk surface. It can now be appreciated that there has been presented a compact laser diode structure that incorporates NLO material and generates visible radiation by second harmonic generation of the fundamental wavelength. The inclusion of the SHG function in the extended cavity of the laser serves to improve SHG conversion efficiency because it permits multiple passes of the fundamental radiation in the nonlinear ridge waveguide. Also, the present invention includes an integrated electro-optic modulator function which enables writing on the optical disk without the need for direct modulation of the laser drive current and the associated instabilities.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do no depart form the true spirit and scope of the invention.

What is claimed is:

1. An integrated electro-optic waveguide device, comprising:

a ridge waveguide section having a first ridge waveguide having a TE mode and being formed of nonlinear optical material to provide the combined functions of electro-optic modulation and second harmonic generation;

a laser diode coupled into said TE mode of said first ridge waveguide, said laser diode emitting light of wavelength λ;

a ridge-to-planar waveguide section;

a second ridge waveguide extending between said ridge waveguide section to said ridge-to-planar waveguide section;

a first integrated circuit for providing driving signals to said ridge waveguide section for modulation of said laser diode so that second harmonic light of wavelength $\lambda_B$ propagates through said second ridge waveguide to said ridge-to-planar waveguide section;

means for expanding said second harmonic light of wavelength $\lambda_B$ to a beam;

a Mach-Zehnder interferometer wavefront sensor having a section for generating tracking error signals and a pick-up section;

a second integrated circuit;

a first beam deflector section for deflecting said expanded beam in response to tracking error signals fed from said wavefront sensor through said second integrated circuit;

a dual grating coupler section having an input grating coupler and an output grating coupler and receiving said expanded beam from said first beam deflector section, said beam being coupled out by said output grating coupler to a target, light reflected from said target being coupled in by said input grating;

a second beam deflector section for receiving said beam from said input grating coupler and deflecting said beam to said pick-up section of said Mach-Zehnder interferometer wavefront sensor; and a third integrated circuit receiving information from said Mach-Zehnder interferometer wavefront sensor and providing signal amplification and conditioning functions to generate tracking error signals and focus error signals.

2. A waveguide device, as set forth in claim 1, including:

a transparent substrate having a front surface portion and a rear surface portion;

a transmitter portion comprising said output coupling grating and being mounted on said rear surface portion;

a receiver portion comprising said input coupling grating and being mounted on said front surface portion.

3. A waveguide device, as set forth in claim 2, wherein said input grating coupler has a grating pitch different from a grating pitch of said output grating coupler, and wherein said target is parallel to said input grating coupler whereby light coupled out of said first waveguide by said output grating coupler is prevented from being directly coupled into said second waveguide by said input grating coupler.

4. A waveguide device, as set forth in claim 2, wherein said transmitter portion further comprises said ridge waveguide section, said planar waveguide region, and said means for expanding said second harmonic light, and wherein said receiver portion further comprises said Mach-Zehnder interferometer wavefront sensor.

5. A waveguide device, as set forth in claim 1, wherein said second integrated circuit provides Mach-Zehnder interferometer bias offset adjustment signals in response to the tracking error signals, the focus error signals and reference signals provided by said third integrated circuit.

* * * * *